United States Patent
Shi et al.

(10) Patent No.: US 11,245,149 B2
(45) Date of Patent: Feb. 8, 2022

(54) SECONDARY BATTERY, BATTERY MODULE AND ELECTRIC VEHICLE

(71) Applicant: CONTEMPORARY AMPEREX TECHNOLOGY CO., LIMITED, Fujian (CN)

(72) Inventors: Dongyang Shi, Fujian (CN); Zhenhua Li, Fujian (CN); Ning Chen, Fujian (CN); Rui Yang, Fujian (CN); Haizu Jin, Fujian (CN); Fei Hu, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/138,716

(22) Filed: Dec. 30, 2020

(65) Prior Publication Data
US 2021/0119287 A1    Apr. 22, 2021

Related U.S. Application Data

(63) Continuation of application No. PCT/CN2019/129620, filed on Dec. 28, 2019.

(30) Foreign Application Priority Data

Dec. 29, 2018 (CN) .......................... 201822269252.0

(51) Int. Cl.
*H01M 2/04* (2006.01)
*H01M 2/26* (2006.01)
(Continued)

(52) U.S. Cl.
CPC ..... *H01M 50/147* (2021.01); *H01M 10/0431* (2013.01); *H01M 50/204* (2021.01);
(Continued)

(58) Field of Classification Search
CPC ......... H01M 10/0431; H01M 10/0472; H01M 10/0525; H01M 2220/20; H01M 50/147;
(Continued)

(56) References Cited

U.S. PATENT DOCUMENTS

2011/0027630 A1* 2/2011 Tsutsumi .......... H01M 10/0459
429/53
2015/0111094 A1* 4/2015 Katayama ........... H01M 50/172
429/179
(Continued)

FOREIGN PATENT DOCUMENTS

CN    106207016 A    12/2016
CN    107968182 A     4/2018
(Continued)

*Primary Examiner* — Lingwen R Zeng
(74) *Attorney, Agent, or Firm* — Scully Scott Murphy & Presser

(57) ABSTRACT

Disclosed are a secondary battery, a battery module and an electric vehicle. The battery module includes a plurality of secondary batteries arranged in sequence. The secondary battery includes an electrode assembly, a housing and a top cover assembly. The electrode assembly is accommodated in an accommodating chamber of the housing. The electrode assembly includes a plurality of electrode units, the plurality of electrode units being stacked in an axial direction of the accommodating chamber. The top cover assembly includes a top cover plate and an insulating member arranged on an inner side of the top cover plate, the top cover plate being connected to the housing, the insulating member being located on a side of the electrode assembly in the axial direction. A first buffer gap is provided between the insulating member and the top cover plate.

17 Claims, 5 Drawing Sheets

(51) Int. Cl.
- *H01M 2/06* (2006.01)
- *H01M 10/0525* (2010.01)
- *H01M 50/147* (2021.01)
- *H01M 50/538* (2021.01)
- *H01M 50/54* (2021.01)
- *H01M 50/572* (2021.01)
- *H01M 50/204* (2021.01)
- *H01M 10/04* (2006.01)
- *H01M 50/16* (2021.01)
- *H01M 50/164* (2021.01)
- *H01M 50/15* (2021.01)
- *H01M 50/176* (2021.01)

(52) U.S. Cl.
CPC ......... *H01M 50/538* (2021.01); *H01M 50/54* (2021.01); *H01M 50/572* (2021.01); *H01M 10/0463* (2013.01); *H01M 50/15* (2021.01); *H01M 50/16* (2021.01); *H01M 50/164* (2021.01); *H01M 50/176* (2021.01); *H01M 2220/20* (2013.01); *Y02E 60/10* (2013.01); *Y02P 70/50* (2015.11)

(58) Field of Classification Search
CPC ............... H01M 50/15; H01M 50/172; H01M 50/3425; H01M 50/394; H01M 50/54; H01M 50/204; H01M 50/538; H01M 50/572; H01M 10/0463; H01M 50/16; H01M 50/164; H01M 50/176; Y02E 60/10; Y02P 70/50

See application file for complete search history.

(56) References Cited

U.S. PATENT DOCUMENTS

2019/0221877 A1* 7/2019 Li .................. H01M 50/528
2019/0363316 A1 11/2019 Lee

FOREIGN PATENT DOCUMENTS

| CN | 208256822 U | 12/2018 |
|----|-------------|---------|
| CN | 209401664 U | 9/2019 |
| KR | 20180092670 A | 8/2018 |
| WO | 2017190563 A1 | 11/2017 |

\* cited by examiner

SECONDARY BATTERY, BATTERY MODULE AND ELECTRIC VEHICLE

CROSS-REFERENCE TO RELATED APPLICATIONS

This application is a continuation of International Application No. PCT/CN2019/129620, filed on Dec. 28, 2019, which claims priority to Chinese Patent Application No. 201822269252.0, filed on Dec. 29, 2018. The disclosures of the aforementioned applications are hereby incorporated by reference in their entireties.

TECHNICAL FIELD

The present disclosure relates to the field of batteries, and in particular to a secondary battery, a battery module and an electric vehicle.

BACKGROUND

A battery module generally includes a plurality of secondary batteries arranged in sequence, and each of the secondary batteries is internally provided with an electrode assembly. During charging and discharging, the electrode assembly will expand in the arrangement direction of the secondary batteries, and the expansion force generated by the electrode assemblies of the plurality of secondary batteries will be superimposed in the arrangement direction and form a large resultant force; and the secondary batteries are squeezed under the resultant force to cause the secondary batteries to fail to operate normally, affecting the service life of the secondary batteries.

SUMMARY

In view of the problems in the background, the object of the present disclosure is to provide a secondary battery, a battery module and an electric vehicle, which can reduce deformation of a top cover plate and improve the appearance and performance of the secondary battery.

In order to achieve the above object, the present disclosure provides a secondary battery. The secondary battery includes an electrode assembly, a housing and a top cover assembly. The housing has an accommodating chamber, the accommodating chamber having an opening, and the electrode assembly being accommodated in the accommodating chamber. The electrode assembly includes a plurality of electrode units, the plurality of electrode units being stacked in an axial direction of the accommodating chamber. The top cover assembly includes a top cover plate and an insulating member arranged on an inner side of the top cover plate, the top cover plate being connected to the housing, and the insulating member being located on a side of the electrode assembly in the axial direction. A first buffer gap is provided between the insulating member and the top cover plate.

In some embodiments, a size of the first buffer gap is positively correlated to a thickness of the electrode assembly in the axial direction, and the size of the first buffer gap is 0.8 mm to 1.5 mm.

In some embodiments, the electrode unit includes a first electrode plate, a second electrode plate and a membrane, which are coiled as a whole. The electrode unit has a main body region and corner regions, the corner regions being arranged at two ends of the main body region in a width direction. The main body regions of two adjacent electrode units are in contact with each other, and the main body regions of the electrode units are opposite the insulating member. A ratio of a width of the main body region to a thickness of the top cover plate is 10-60.

In some embodiments, the width of the main body region is 30 mm to 60 mm. The thickness of the top cover plate is 1 mm to 3 mm.

In some embodiments, in the main body region, a second buffer gap is formed between the first electrode plate and the second electrode plate, and a size of the second buffer gap is 2 μm to 20 μm.

In some embodiments, one side of the insulating member close to the top cover plate is provided with a first recess. One side of the top cover plate close to the insulating member is provided with a fixing hole. The insulating member is provided with a connecting portion extending from a bottom wall of the first recess, and the connecting portion is inserted into the fixing hole of the top cover plate and is fixed to the top cover plate.

In some embodiments, a plurality of connecting portions are provided, the plurality of connecting portions each including a first connecting portion and a second connecting portion, and two ends of the first recess in the width direction are respectively provided with a first side wall and a second side wall. The first connecting portion is arranged close to the first side wall, and the second connecting portion is arranged close to the second side wall.

In some embodiments, the fixing hole includes a first hole and a second hole, the first hole extending from a surface of the top cover plate close to the insulating member, and the second hole extending from an end of the first hole away from the insulating member. A hole diameter of the second hole is larger than a hole diameter of the first hole.

In some embodiments, the connecting portion includes a first region and a second region, the first region extending from a bottom wall of the first recess, and the second region extending from an end of the first region away from the bottom wall and being inserted into the fixing hole.

In some embodiments, the material of the insulating member is plastic, and the Young's modulus of the insulating member is 0.5 Gpa to 1.2 Gpa.

The present disclosure further provides a battery module, including the secondary battery as described above. A plurality of secondary batteries are provided and are arranged in sequence, and an arrangement direction of the plurality of secondary batteries is perpendicular to the axial direction.

In some embodiments, the battery module further includes two end plates. The two end plates are respectively located on two ends of the plurality of secondary batteries in the arrangement direction, and the two end plates clamp the plurality of secondary batteries.

The present disclosure further provides an electric vehicle including the battery module as described above.

The present disclosure has the following beneficial effects: in the present application, the plurality of electrode units in the secondary battery are arranged in the axial direction, and therefore, the expansion of the plurality of electrode units will be superimposed in the axial direction. In the battery module, the arrangement direction of the plurality of secondary batteries is perpendicular to the axial direction, and therefore, even if the expansion amounts of all the electrode assemblies in the arrangement direction are superimposed together, no excessive resultant force will be generated, thereby preventing the secondary batteries from being crushed so as to ensure the performance and service life of the secondary batteries. When the electrode assembly squeezes the insulating member, the insulating member can release the expansion force through deformation. The first buffer gap can reduce the expansion force transferred to the top cover plate by means of absorbing the expansion amount of the electrode assembly, thereby reducing the deformation of the top cover plate so as to improve the appearance and performance of the secondary battery.

Figure 1:
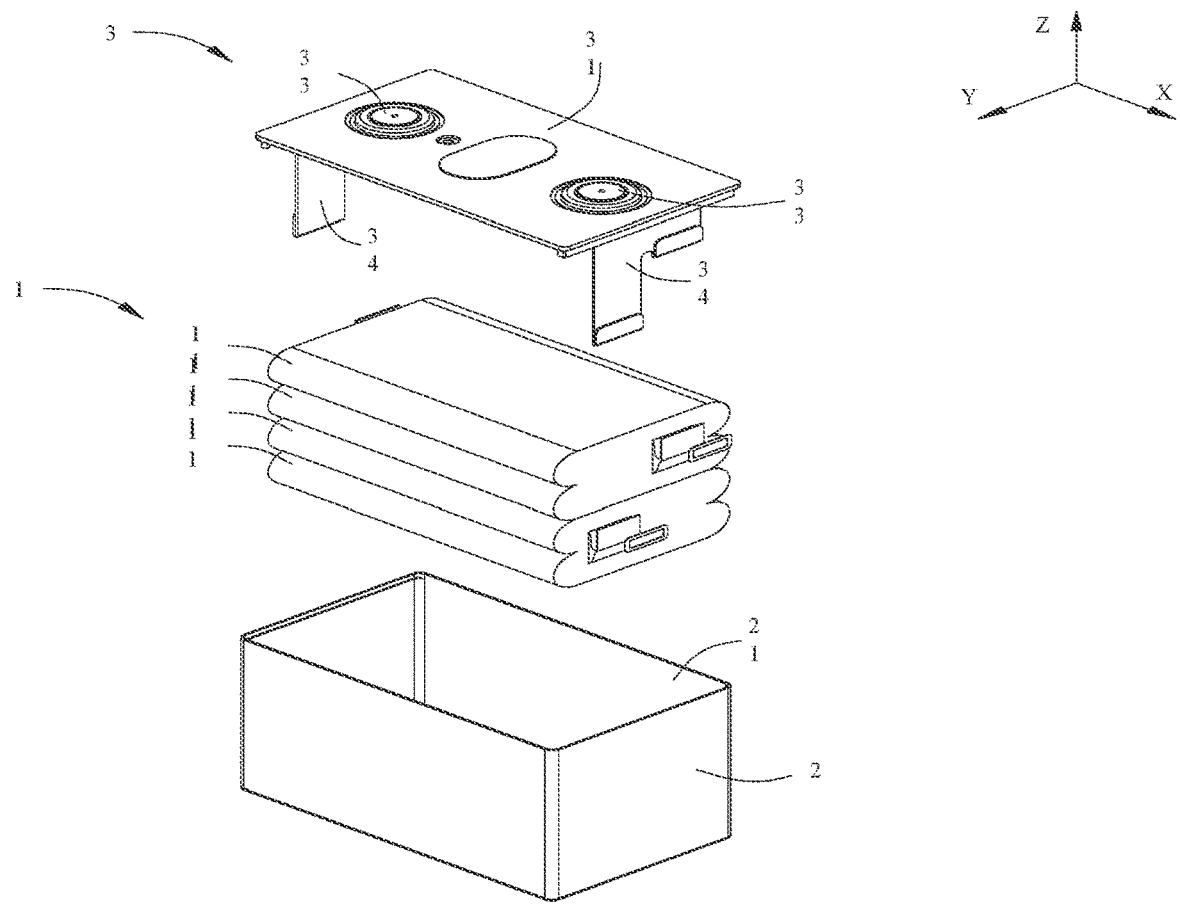
FIG. 1 is an exploded view of a secondary battery according to the present disclosure.

| | |
|---|---|
| 1 Electrode assembly | 323a First connecting portion |
| 11 Electrode unit | 323b Second connecting portion |
| 111 First electrode plate | 324 First side wall |
| 112 Second electrode plate | 325 Second side wall |
| 113 Membrane | 326 Second recess |
| 2 Housing | 33 Electrode terminal |
| 21 Accommodating chamber | 34 Current collecting member |
| 3 Top cover assembly | P1 First region |
| 31 Top cover plate | P2 Second region |
| 311 Fixing hole | P3 Main body region |
| 311a First hole | P4 Corner region |
| 311b Second hole | G1 First buffer gap |
| 32 Insulating member | G2 Second buffer gap |
| 321 First recess | X Lengthwise direction |
| 322 Bottom wall | Y Width direction |
| 323 Connecting portion | Z Axial direction |

DESCRIPTION OF EMBODIMENTS

To make the objectives, technical solutions, and advantages of the present application clearer and more comprehensible, the present application is further illustrated in detail below in conjunction with the drawings and embodiments. It should be understood that the specific embodiments described herein are merely used to explain the present application and are not intended to limit the present application.

In the description of the present application, unless clearly specified and defined otherwise, the terms "first", "second" and "third" are only used for descriptive purposes, and cannot be understood as indicating or implying relative importance; the term "plurality" means two or more; and unless specified and defined otherwise, the terms "connection", "fixing", etc. should be understood in a broad sense, for example, "connection" may be a fixed connection, a detachable connection, an integral connection, or an electrical connection, or a signal connection; and "connection" may be a direct connection or an indirect connection via an intermediate medium. Those of ordinary skill in the art could understand the specific meanings of the foregoing terms in the present application according to specific circumstances.

In the description of this specification, it should be understood that the orientation words "up", "down", etc. described in embodiments of the present application are described from the angle shown in the accompanying drawings, and should not be understood as limiting the embodiments of the present application.

In the present application, a battery module generally includes a secondary battery, an end plate, a side plate and a bus bar. A plurality of secondary batteries are provided and are arranged in sequence. The secondary battery of the present application may be a prismatic lithium-ion battery. The arrangement direction of the plurality of secondary batteries may be parallel to a width direction Y of the secondary batteries. Two end plates are provided and are respectively arranged at two ends of the plurality of secondary batteries in the arrangement direction, two side plates are provided and are respectively arranged on two sides of the plurality of secondary batteries, and the end plates and the side plates are welded together and form a rectangular frame. The plurality of secondary batteries are fixed to the frame. The bus bar connects the plurality of secondary batteries together in series, in parallel, or in series-parallel.

Figure 2:
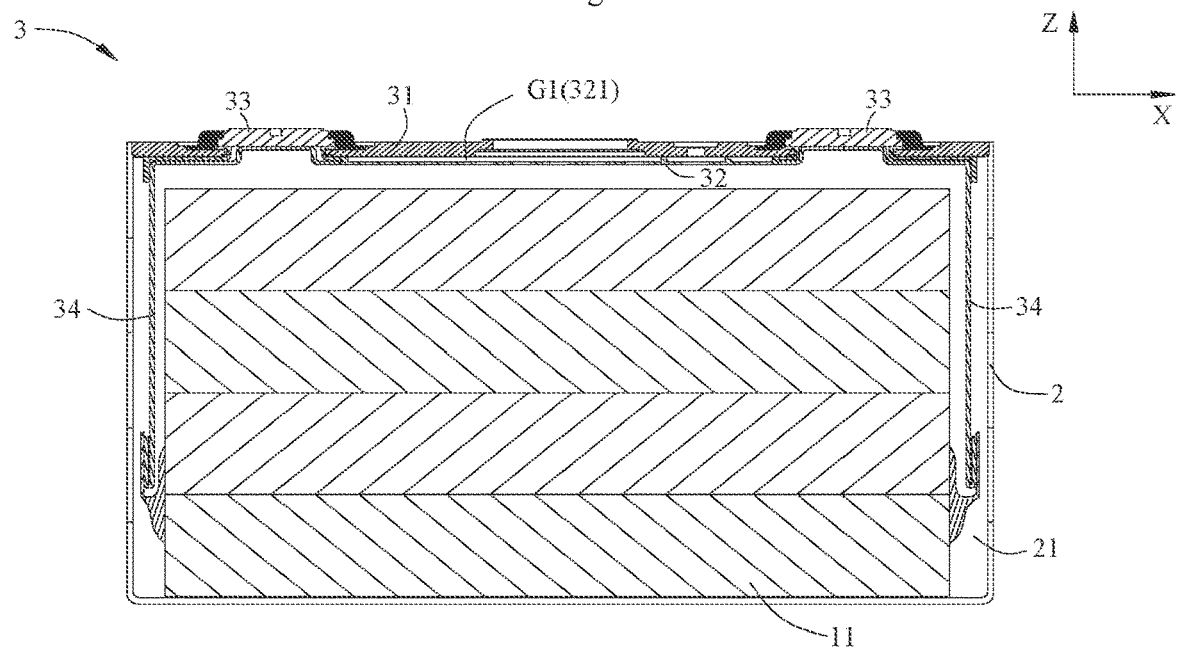
FIG. 2 is a cross-sectional view of the secondary battery according to the present disclosure.

Referring to FIGS. 1 and 2, the secondary battery of the present application includes an electrode assembly 1, a housing 2 and a top cover assembly 3.

An accommodating chamber 21 is formed inside the housing 2 to accommodate the electrode assembly 1 and an electrolytic solution. An opening is formed in the housing 2 at an end in an axial direction Z, and the electrode assembly 1 may be placed in the housing 2 through the opening. The housing 5 may be made of a conductive metal material such as aluminum or aluminum alloy. The axial direction Z is parallel to an extending direction of the accommodating chamber 21 and is perpendicular to the plane where the opening is located. The battery module of the present application can be used in an electric vehicle. When the top cover assembly 3 of the secondary battery on the electric vehicle is approximately parallel to the ground, the axial direction Z is parallel to a height direction of the secondary battery and is perpendicular to the width direction Y and a lengthwise direction X of the secondary battery and the arrangement direction of the plurality of secondary batteries.

Figure 3:
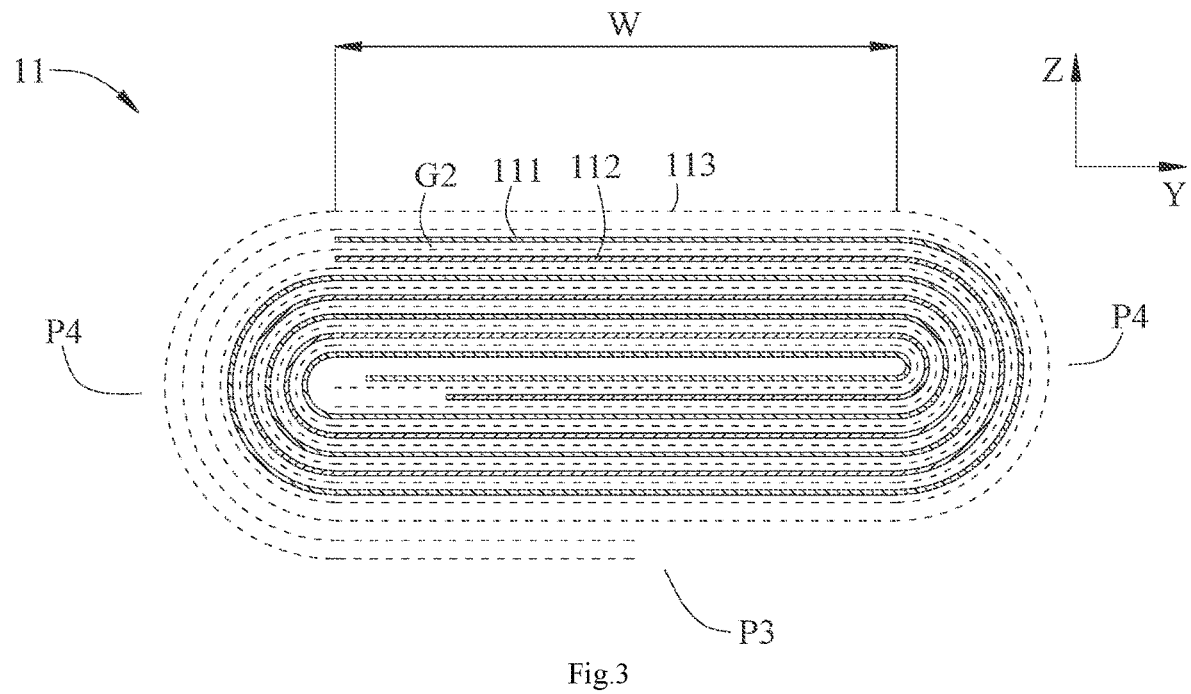
FIG. 3 is a cross-sectional view of an electrode unit in FIG. 1.
Figure 4:
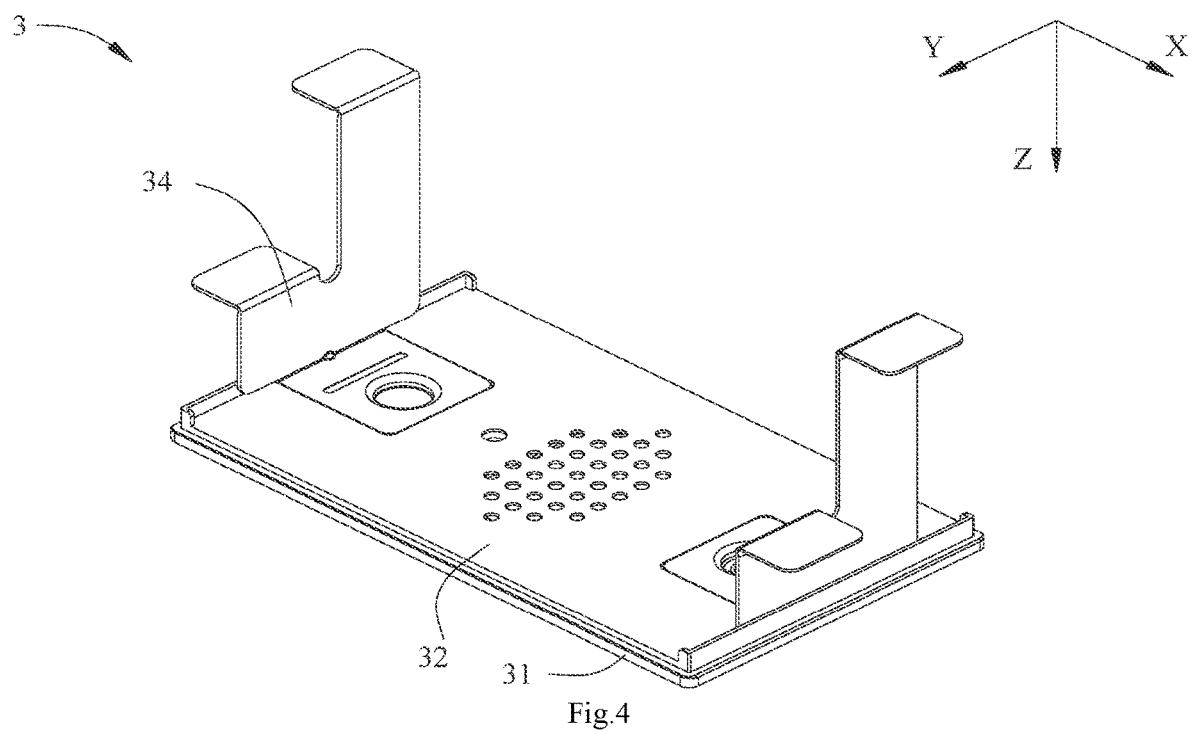
FIG. 4 is a schematic diagram of a top cover assembly in FIG. 1.
Figure 5:
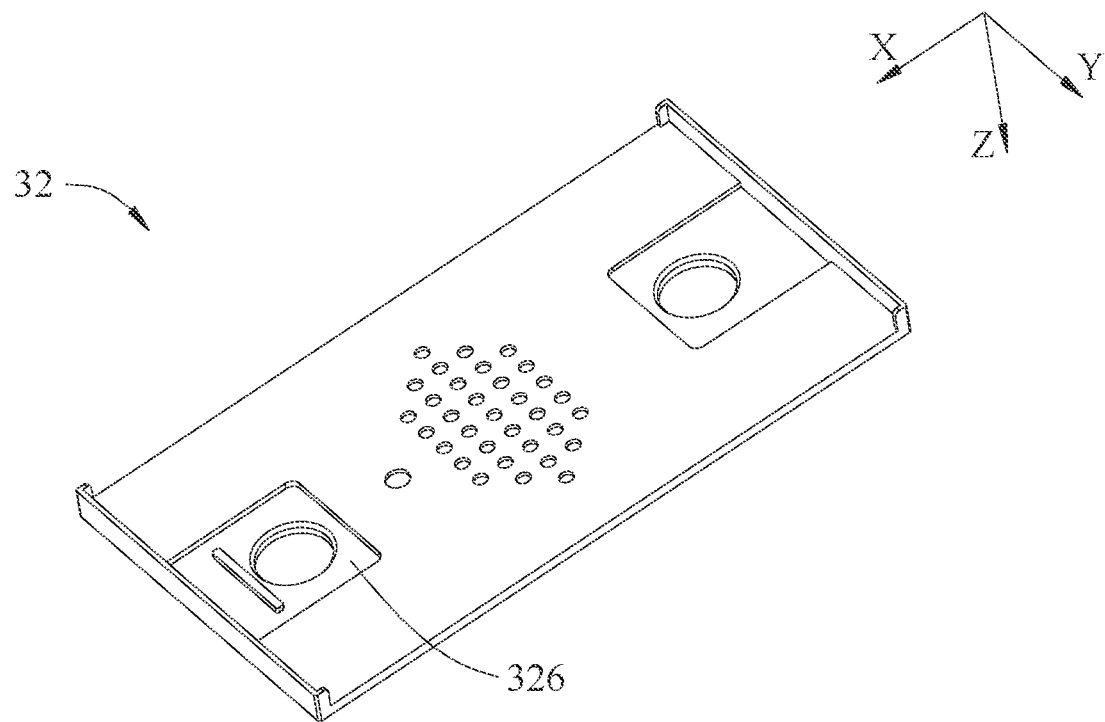
FIG. 5 is a schematic diagram of an insulating member in FIG. 4.

The electrode assembly 1 includes a plurality of electrode units 11, the plurality of electrode units 11 being stacked in the axial direction Z of the accommodating chamber 21. Referring to FIG. 3, each of the electrode units 11 includes a first electrode plate 111, a second electrode plate 112 and a membrane 113, the membrane 113 separating the first electrode plate 111 from the second electrode plate 112. The electrode unit 11 may be formed by spirally coiling the first electrode plate 111, the second electrode plate 112 and the membrane 113, and the electrode unit 11 is pressed under pressure to form a flat structure. Alternatively, each of the electrode units 11 may also be formed by stacking the first electrode plate 111, the second electrode plate 112 and the membrane 113.

The first electrode plate 111 includes an aluminum foil and a positive electrode active material coated on the surface of the aluminum foil, the positive electrode active material including lithium manganate or lithium iron phosphate. The second electrode plate 112 includes a copper foil and a negative electrode active material coated on the surface of the copper foil, the negative electrode active material including graphite or silicon.

The top cover assembly 3 includes a top cover plate 31, an insulating member 32, an electrode terminal 33 and a current collecting member 34. The top cover plate 31 is connected to the housing 2 and covers the opening of the housing 2 so as to enclose the electrode assembly 1 in the accommodating chamber 21 of the housing 2. The insulating member 32 is arranged on the inner side of the top cover plate 31, that is, the side of the top cover plate 31 closed to the electrode assembly 1. The electrode terminal 33 is arranged at the top cover plate 31 and protrudes to the outside of the top cover plate 31. Two electrode terminals 33 and two current collecting members 34 are provided, one of the current collecting members 34 connecting the first electrode plate 111 and one electrode terminal 33, and the other current collecting member 34 connecting the second electrode plate 112 and the other electrode terminal 33.

The insulating member 32 is located on a side of the electrode assembly 1 in the axial direction Z. In other words, the insulating member 32 is located at an end of the plurality of electrode unit 11 in the arrangement direction.

During charging and discharging, each electrode unit 11 will expand. In the present application, the plurality of electrode units 11 in the secondary battery are arranged in the axial direction Z, and therefore, the expansion of the plurality of electrode units 11 will be superimposed in the axial direction Z. In the width direction Y, the expansion of the plurality of electrode units 11 is small, and therefore, the overall expansion amount of the electrode assembly 1 in the width direction Y is small. Accordingly, the expansion force of the electrode assembly 1 acting on the housing 2 is also small.

In the battery module, the arrangement direction of the plurality of secondary batteries is perpendicular to the axial direction Z, and therefore, even if the expansion amounts of all the electrode assemblies 1 in the arrangement direction are superimposed together, no excessive resultant force will be generated, thereby preventing the secondary batteries from being crushed so as to ensure the performance and service life of the secondary batteries.

In addition, in the known technology, the two end plates of the battery module need to clamp the plurality of secondary batteries. If the resultant force generated by the expansion of the secondary batteries is too large, the welds between the end plates and the side plates may break, resulting in failure of the battery module. However, in the present application, the resultant force generated by the plurality of secondary batteries during expansion is small, thereby avoiding failure of the battery module.

In the secondary battery, when the electrode units 11 expand, the expansion amounts of the plurality of electrode units 11 are superimposed in the axial direction Z, thereby causing the electrode unit 11 (i.e. the electrode unit 11 of the electrode assembly 1 closest to the insulating member 32) to be in contact with the insulating member 32 or even squeeze the insulating member 32. When the electrode assembly 1 squeezes the insulating member 32, the expansion force will be transferred to the top cover plate 31, and therefore, the top cover plate 31 is likely to deform under the action of the expansion force, thereby affecting the appearance and performance of the secondary battery.

Therefore, in the present application, a first buffer gap G1 is preferably provided between the insulating member 32 and the top cover plate 31. When the electrode assembly 1 squeezes the insulating member 32, the insulating member 32 can release the expansion force through deformation. By means of providing the first buffer gap G1, it is possible to prevent the top cover plate 31 from restricting the deformation of the insulating member 32, thereby achieving a buffering effect. That is, the first buffer gap G1 can reduce the expansion force transferred to the top cover plate 31 by means of absorbing the expansion amount of the electrode assembly 1, thereby reducing the deformation of the top cover plate 31 so as to improve the appearance and performance of the secondary battery.

When the thickness of the electrode assembly 1 in the axial direction Z increases, the expansion amount of the electrode assembly 1 during charging and discharging will also increase accordingly, and the first buffer gap G1 also needs to absorb more expansion amount. Therefore, the size of the first buffer gap G1 in the axial direction Z also needs to be increased accordingly. In other words, in the axial direction Z, the size of the first buffer gap G1 is positively correlated with the thickness of the electrode assembly 1.

Preferably, the size of the first buffer gap G1 in the axial direction Z is 0.8 mm to 1.5 mm. If the size of the first buffer gap G1 is small, such as less than 0.8 mm, the expansion amount that the first buffer gap G1 can absorb is limited, and the top cover plate 31 will still deform to a great extent. If the size of the first buffer gap G1 is large, such as greater than 1.5 mm, the first buffer gap G1 will occupy a large space, thereby reducing the energy density of the secondary battery.

The electrode unit 11 is coiled to form a flat structure, which has a main body region P3 and corner regions P4, the corner regions P4 being arranged at two ends of the main body region P3 in the width direction Y. Before the electrode unit 11 expands, the first electrode plate 111 and the second electrode plate 112 in the main body region P3 are substantially perpendicular to the axial direction Z, and the first electrode plate 111 and the second electrode plate 112 in the corner region P4 are substantially arc-shaped. When the electrode unit 11 expands, the expansion thereof in the axial direction Z originates from the expansion of the main body region P3.

In the secondary battery, the plurality of electrode units 11 are directly stacked in the axial direction Z, and the main body regions P3 of two adjacent electrode units 11 are in contact with each other.

The main body region P3 of the topmost electrode unit 11 (i.e. the electrode unit 11 closest to the insulating member 32) is vertically arranged opposite to the insulating member 32 in the axial direction Z. Before the electrode unit 11 expand, the surface of the main body region P3 close to the insulating member 32 is substantially parallel to the surface of the insulating member 32 close to the main body region P3. When the electrode unit 11 expands, the two surfaces opposite each other are more likely to come into contact uniformly.

Referring to FIG. 3, the width of the main body region P3 in the width direction Y is W. When the electrode unit 11 has a constant thickness in the axial direction Z, the greater the value of W, the larger the force of the main body region P3 acting on the insulating member 32 and the top cover plate 31 during expansion; and on the contrary, the less the value of W, the smaller the force of the main body region P3 acting on the insulating member 32 and the top cover plate 31 during expansion.

Figure 10:
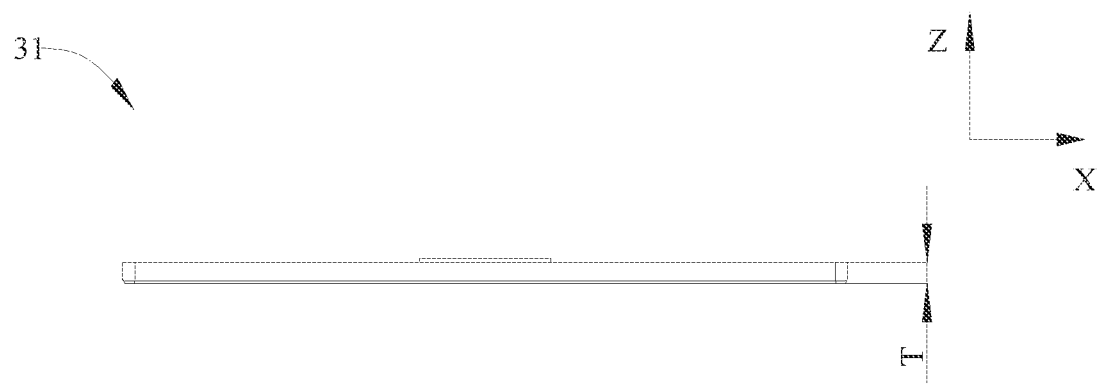
FIG. 10 is a front view of the top cover plate in FIG. 9.

Referring to FIG. 10, the thickness of the top cover plate 31 in the axial direction Z is T. The greater the value of T, the higher the strength of the top cover plate 31, and the stronger the deformation resistance; and on the contrary, the less the value of T, the lower the strength of the top cover plate 31, and the weaker the deformation resistance.

In the present application, the value of W/T is preferably 10-60.

When W/T>60, the force of the main body region P3 acting on the insulating member 32 and the top cover plate 31 during expansion is larger, while the strength of the top cover plate 31 is lower, so the top cover plate 31 cannot effectively constrain the main body region P3, thus causing the severe deformation of the top cover plate 31 and the main body region P3. When the top cover plate 31 is severely deformed, the electrode terminal 33 will have a displacement, causing the electrode terminal 33 to separate from a bus bar of the battery module, thus resulting in failure of the battery module. When the main body region P3 is severely deformed, the outermost electrode plate of the electrode unit 11 is likely to be broken due to stress concentration, thereby reducing the performance of the secondary battery. Therefore, preferably, W/T≤60.

When W/T<10, the thickness of the top cover plate 31 is too large, and the strength thereof is high. Therefore, the top cover plate 31 can effectively constrain the main body region P3. However, due to the high strength of the top cover plate 31, the expansion force cannot be released by means of a slight deformation, so the top cover plate 31 will apply a large reaction force to the main body region P3; and at the same time, when the electrode unit 11 expands, the smaller the width of the main body region P3, the larger the binding force of corner region P4 to the main body region P3 in the axial direction Z. Under the combined action of the reaction force and the binding force, the gap between the first electrode plate 111 and the second electrode plate 112 in the main body region P3 becomes smaller, such that the electrolytic solution cannot penetrate into the main body region P3, causing a lithium precipitation problem. Therefore, preferably, W/T≥10.

Specifically, the width of the main body region P3 may be 30 mm to 60 mm, and the thickness of the top cover plate 31 may be 1 mm to 3 mm.

Referring to FIG. 3, in the main body region P3, a second buffer gap G2 is formed between the first electrode plate 111 and the second electrode plate 112. During charging and discharging, the first electrode plate 111 and the second electrode plate 112 will expand; while the second buffer gap G2 can absorb the expansion amount of the two to reduce the expansion force, preventing the first electrode plate 111 and the second electrode plate 112 from being pulled to break. At the same time, the electrolytic solution can also enter the inside of the electrode unit 11 via the second buffer gap G2, thereby improving the wettability.

The size of the second buffer gap G2 is 2 μm to 20 μm. If the size of the second buffer gap G2 is smaller than 2 μm, when the first electrode plate 111 and the second electrode plate 112 expand, the second buffer gap G2 therebetween almost disappears, and the electrolytic solution cannot enter between the first electrode plate 111 and the second electrode plate 112, causing the wettability of the electrode unit 11 to deteriorate, inducing the problem of lithium precipitation. If the size of the second buffer gap G2 is larger than 20 μm the energy density of the electrode unit 11 will be reduced.

The material of the insulating member 32 is an insulating material, such as plastic. When the electrode assembly 1 squeezes the insulating member 32, the insulating member 32 made of a plastic material can absorb the expansion force through deformation, thereby reducing the reaction force applied to the electrode assembly 1 so as to prevent the electrode plate from being fractured.

If the Young's modulus of the insulating member 32 is too large, the insulating member 32 has poor deformability and cannot effectively absorb the expansion force. Therefore, preferably, the Young's modulus of the insulating member 32 is 0.5 Gpa to 1.2 Gpa.

Figure 6:
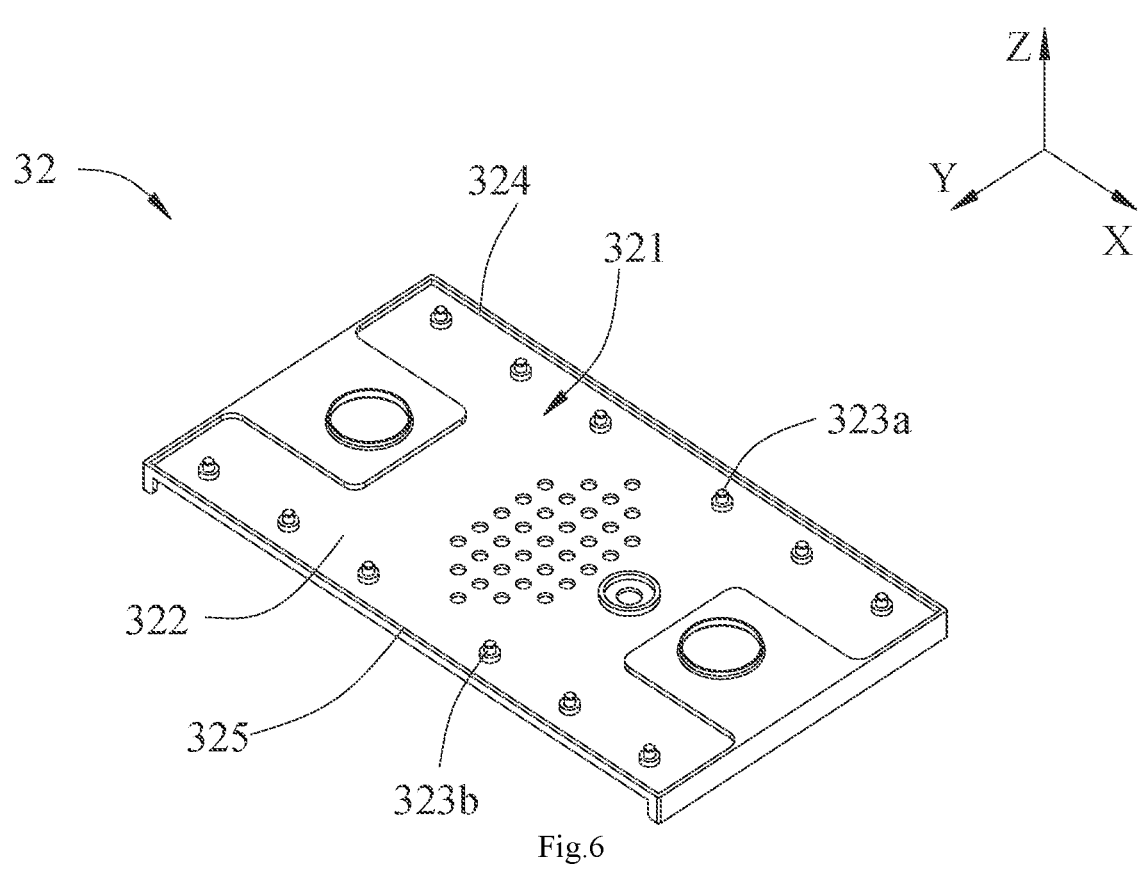
FIG. 6 is another schematic diagram of the insulating member in FIG. 4.

Referring to FIG. 6, in the present application, the side of the insulating member 32 close to the top cover plate 31 is provided with a first recess 321. By means of providing the first recess 321, a first buffer gap G1 is formed between the insulating member 32 and the top cover plate 31. Alternatively, the first buffer gap G1 may also be formed by means of providing a recess on the side of the top cover plate 31 close to the insulating member 32.

Figure 11:
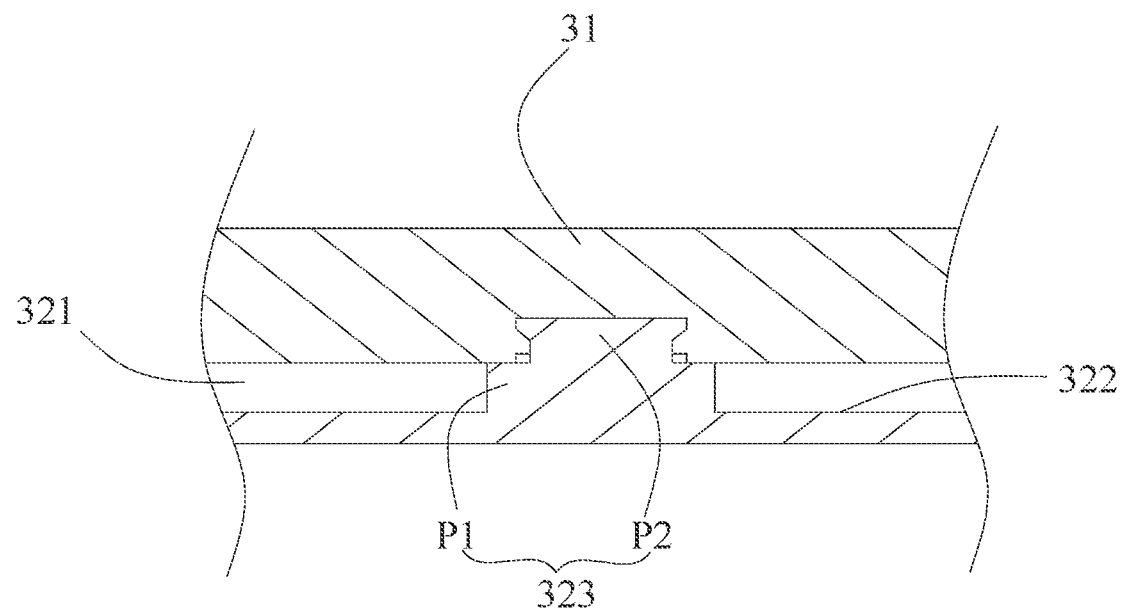
FIG. 11 is a schematic diagram of the connection between the top cover plate and the insulating member according to the present disclosure.
Figure 12:
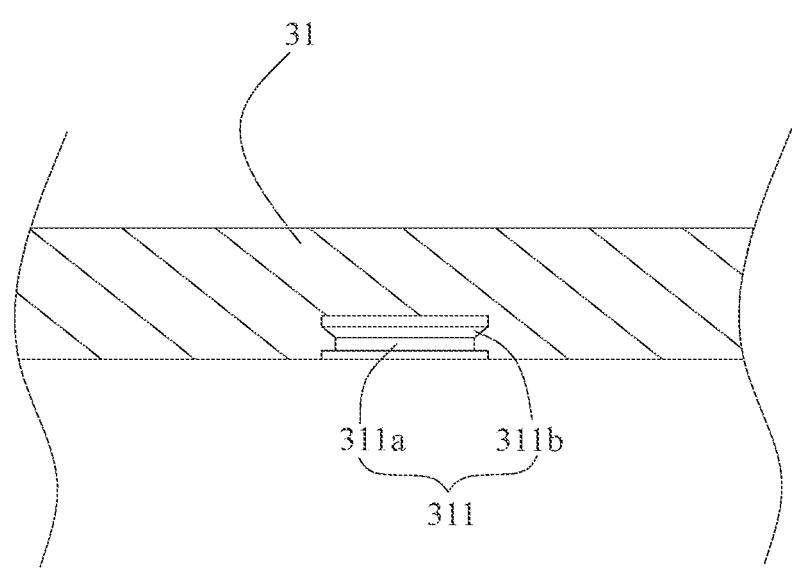
FIG. 12 is a schematic diagram of the top cover plate in FIG. 11.

Referring to FIGS. 11 and 12, the side of the top cover plate 31 close to the insulating member 32 is provided with a fixing hole 311. The insulating member 32 is provided with a connecting portion 323 extending from a bottom wall 322 of the first recess 321, and the connecting portion 323 is inserted in the fixing hole 311 of the top cover plate 31 and is fixed to the top cover plate 31. The connecting portion 323 can be fixed to the top cover plate 31 by way of hot-melting.

The connecting portion 323 includes a first region P1 and a second region P2, the first region P1 extending from the bottom wall 322 of the first recess 321, and the second region P2 extending from an end of the first region P1 away from the bottom wall 322 and being inserted into the fixing hole 311. The diameter of the first region P1 is larger than the diameter of the second region P2 and the diameter of the fixing hole 311. A stepped connecting portion 323 facilitates the assembly and positioning.

The fixing hole 311 includes a first hole 311a and a second hole 311b, the first hole 311a extending from a surface of the top cover plate 31 close to the insulating member 32, and the second hole 311b extending from an end of the first hole 311a away from the insulating member 32. The hole diameter of the second hole 311b is larger than the hole diameter of the first hole 311a.

Before the insulating member 32 is assembled, the diameter of the second region P2 is smaller than the diameter of the first hole 311a. When the top cover plate 31 and the insulating member 32 are assembled, the second region P2 can be heated at first to enable the end of the second region P2 becomes molten, and then the second region P2 is inserted into the fixing hole 311. The molten part is filled into the second hole 311b, and after the molten part is cured, the second region P2 is bonded to the top cover plate 31. At the same time, since the hole diameter of the second hole 311b is larger than the hole diameter of the first hole 311a, the second region P2 is clamped in the fixing hole 311.

Figure 7:
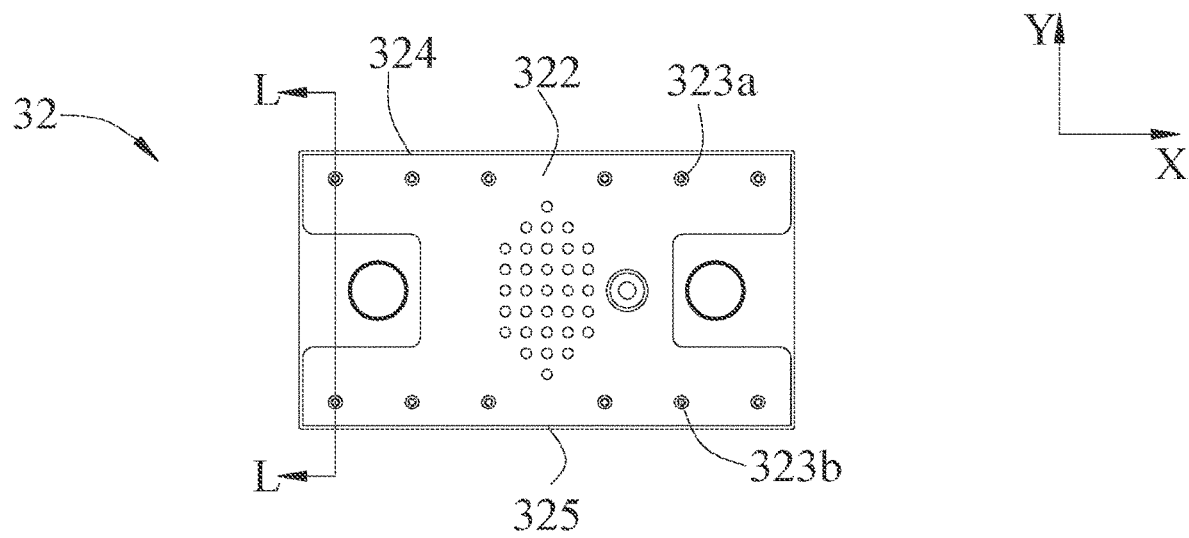
FIG. 7 is a top view of the insulating member in FIG. 6.
Figure 8:
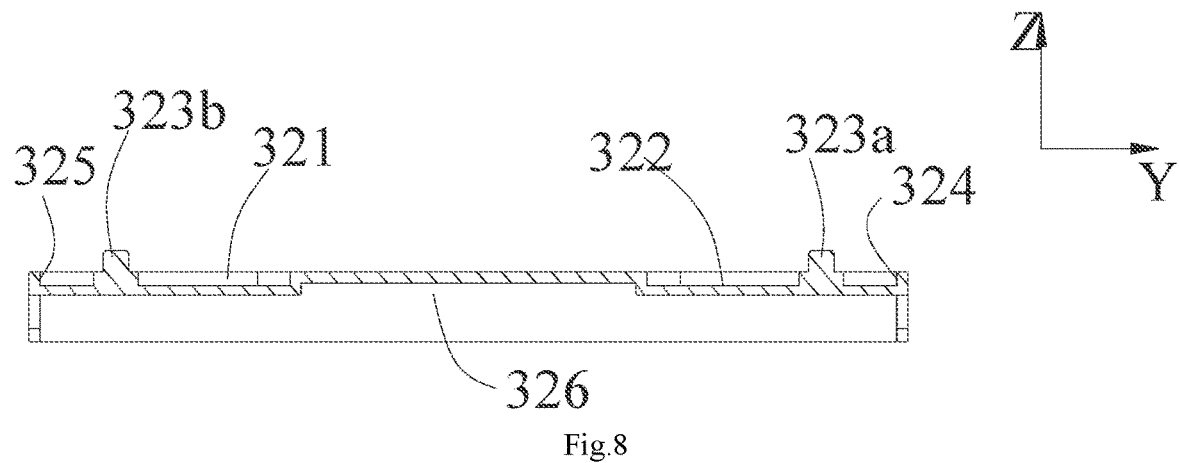
FIG. 8 is a cross-sectional view taken along a line L-L in FIG. 7.
Figure 9:
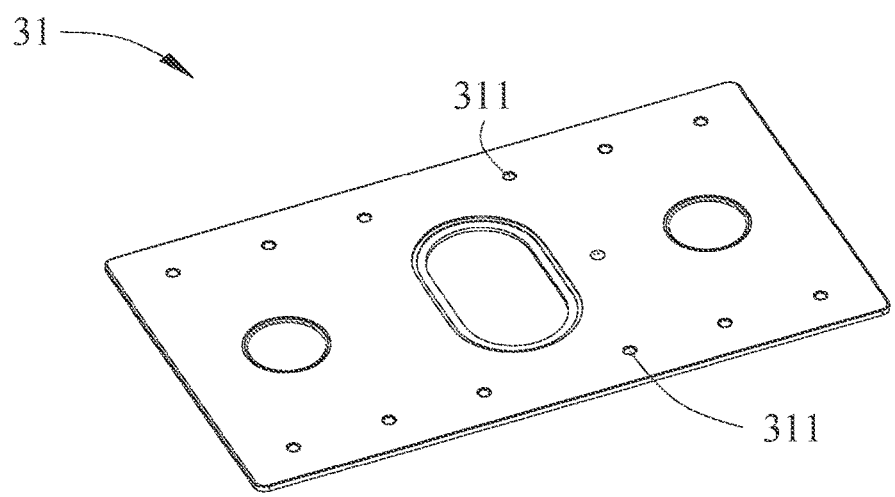
FIG. 9 is a schematic diagram of the top cover plate in FIG. 4.

Referring to FIGS. 6 and 7, in order to ensure the connection strength of the top cover plate 31 and the insulating member 32, a plurality of connecting portions 323 are preferably provided. At the position where the connecting portion 323 is provided, the insulating member 32 is restricted by the top cover plate 31, so the insulating member is not likely to deform and thus cannot preferably release the expansion force of the expanded electrode assembly 1.

During charging and discharging, the electrode unit 11 expands most severely in the width direction Y, that is, the insulating member 32 can at least deform in the middle in the width direction Y, so the connecting portion 323 cannot be arranged in the middle of the insulating member 32 in the width direction.

Two ends of the first recess 321 in the width direction Y are provided with a first side wall 324 and a second side wall 325, and the first side wall 324 and the second side wall 325 are respectively located at two edges of the insulating member 32 in the width direction Y. The plurality of connecting portions 323 include a first connecting portion 323a and a second connecting portion 323b. The first connecting portion 323a is arranged close to the first side wall 324, and the second connecting portion 323b is arranged close to the second side wall 325. A plurality of first connecting portions 323a may be provided and arranged in sequence in the lengthwise direction X, and a plurality of second connecting portions 323b may be provided and arranged in sequence in the lengthwise direction X. In the present application, the first connecting portion 323a and the second connecting portion 323b are located away from the center of the insulating member 32 in the width direction Y, thereby reducing the influence on the middle of the insulating member 32 in the width direction Y.

What is claimed is:

1. A secondary battery, comprising an electrode assembly, a housing and a top cover assembly, wherein
   the housing has an accommodating chamber, the accommodating chamber having an opening, and the electrode assembly being accommodated in the accommodating chamber;
   the electrode assembly comprises a plurality of electrode units, the plurality of electrode units being stacked in an axial direction of the accommodating chamber;
   the top cover assembly comprises a top cover plate and an insulating member arranged on an inner side of the top cover plate, the top cover plate being connected to the housing, and the insulating member being located on a side of the electrode assembly in the axial direction; and
   a first buffer gap is provided between the insulating member and the top cover plate,
   wherein one side of the insulating member close to the top cover plate is provided with a first recess to form the buffer gap, one side of the top cover plate close to the insulating member is provided with a fixing hole, the insulating member is provided with a connecting portion extending from a bottom wall of the first recess, and the connecting portion is inserted into the fixing hole of the top cover plate and is fixed to the top cover plate, the fixing hole comprises a first hole and a second hole, the first hole extending from a surface of the top cover plate close to the insulating member, and the second hole extending from an end of the first hole away from the insulating member, and a hole diameter of the second hole is larger than a hole diameter of the first hole.

2. The secondary battery according to claim 1, wherein a size of the first buffer gap is positively correlated to a thickness of the electrode assembly in the axial direction, and the size of the first buffer gap is 0.8 mm to 1.5 mm.

3. The secondary battery according to claim 1, wherein the electrode unit comprises a first electrode plate, a second electrode plate and a membrane, which are coiled as a whole; and
   the electrode unit has a main body region and corner regions, the corner regions being arranged at two ends of the main body region in a width direction, the main body regions of the two adjacent electrode units being in contact with each other, and the main body region of the electrode unit being opposite the insulating member.

4. The secondary battery according to claim 3, wherein a ratio of a width of the main body region to a thickness of the top cover plate is 10-60.

5. The secondary battery according to claim 3, wherein the width of the main body region is 30 mm to 60 mm, and the thickness of the top cover plate is 1 mm to 3 mm.

6. The secondary battery according to claim 3, wherein in the main body region, a second buffer gap is formed between the first electrode plate and the second electrode plate.

7. The secondary battery according to claim 6, a size of the second buffer gap is 2 μm to 20 μm.

8. The secondary battery according to claim 1, wherein a plurality of connecting portions are provided, the plurality of connecting portions each comprising a first connecting portion and a second connecting portion, and two ends of the first recess in the width direction are respectively provided with a first side wall and a second side wall; and
   the first connecting portion is arranged close to the first side wall, and the second connecting portion is arranged close to the second side wall.

9. The secondary battery according to claim 1, wherein the connecting portion comprises a first region and a second region, the first region extending from a bottom wall of the first recess, and the second region extending from an end of the first region away from the bottom wall and being inserted into the fixing hole.

10. The secondary battery according to claim 1, wherein the material of the insulating member is plastic.

11. The secondary battery according to claim 10, the Young's modulus of the insulating member is 0.5 Gpa to 1.2 Gpa.

12. A battery module, comprising a secondary battery, the secondary battery comprising an electrode assembly, a housing and a top cover assembly, wherein
   the housing has an accommodating chamber, the accommodating chamber having an opening, and the electrode assembly being accommodated in the accommodating chamber;
   the electrode assembly comprises a plurality of electrode units, the plurality of electrode units being stacked in an axial direction of the accommodating chamber;
   the top cover assembly comprises a top cover plate and an insulating member arranged on an inner side of the top cover plate, the top cover plate being connected to the housing, and the insulating member being located on a side of the electrode assembly in the axial direction; and
   a first buffer gap is provided between the insulating member and the top cover plate,
   wherein a plurality of secondary batteries are provided and are arranged in sequence, and an arrangement direction of the plurality of secondary batteries is perpendicular to the axial direction;
   wherein one side of the insulating member close to the top cover plate is provided with a first recess to form the buffer gap, one side of the top cover plate close to the insulating member is provided with a fixing hole, the insulating member is provided with a connecting portion extending from a bottom wall of the first recess, and the connecting portion is inserted into the fixing hole of the top cover plate and is fixed to the top cover plate, the fixing hole comprises a first hole and a second hole, the first hole extending from a surface of the top cover plate close to the insulating member, and the second hole extending from an end of the first hole away from the insulating member, and a hole diameter of the second hole is larger than a hole diameter of the first hole.

13. The battery module according to claim 12, further comprising two end plates, the two end plates being respectively located at two ends of the plurality of secondary batteries in the arrangement direction, and the two end plates clamping the plurality of secondary batteries.

14. The battery module according to claim 12, wherein a size of the first buffer gap is positively correlated to a thickness of the electrode assembly in the axial direction, and the size of the first buffer gap is 0.8 mm to 1.5 mm.

15. The battery module according to claim 12, wherein the electrode unit comprises a first electrode plate, a second electrode plate and a membrane, which are coiled as a whole; and the electrode unit has a main body region and corner regions, the corner regions being arranged at two ends of the main body region in a width direction, the main body regions of the two adjacent electrode units being in contact with each other, and the main body region of the electrode unit being opposite the insulating member.

16. An electric vehicle, comprising a battery module, the battery module comprising a secondary battery, the secondary battery comprising an electrode assembly, a housing and a top cover assembly, wherein the housing has an accommodating chamber, the accommodating chamber having an opening, and the electrode assembly being accommodated in the accommodating chamber;

the electrode assembly comprises a plurality of electrode units, the plurality of electrode units being stacked in an axial direction of the accommodating chamber;

the top cover assembly comprises a top cover plate and an insulating member arranged on an inner side of the top cover plate, the top cover plate being connected to the housing, and the insulating member being located on a side of the electrode assembly in the axial direction; and a first buffer gap is provided between the insulating member and the top cover plate, wherein a plurality of secondary batteries are provided and are arranged in sequence, and an arrangement direction of the plurality of secondary batteries is perpendicular to the axial direction;

wherein one side of the insulating member close to the top cover plate is provided with a first recess to form the buffer gap, one side of the top cover plate close to the insulating member is provided with a fixing hole, the insulating member is provided with a connecting portion extending from a bottom wall of the first recess, and the connecting portion is inserted into the fixing hole of the top cover plate and is fixed to the top cover plate, the fixing hole comprises a first hole and a second hole, the first hole extending from a surface of the top cover plate close to the insulating member, and the second hole extending from an end of the first hole away from the insulating member, and a hole diameter of the second hole is larger than a hole diameter of the first hole.

17. The electric vehicle according to claim 16, wherein a size of the first buffer gap is positively correlated to a thickness of the electrode assembly in the axial direction, and the size of the first buffer gap is 0.8 mm to 1.5 mm.

* * * * *